(No Model.) 2 Sheets—Sheet 1.

O. HEBERT.
TWO WHEELED VEHICLE.

No. 253,042. Patented Jan. 31, 1882.

WITNESSES:
J. C. Wilcke
H. A. Higgins

INVENTOR:
Oliver Hebert (No Model.) 2 Sheets—Sheet 2.
O. HEBERT.
TWO WHEELED VEHICLE.
No. 253,042. Patented Jan. 31, 1882.
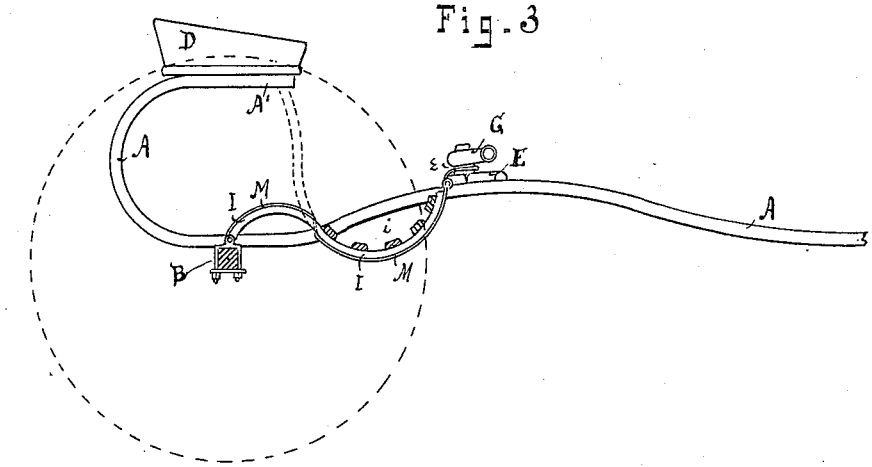
Fig. 3
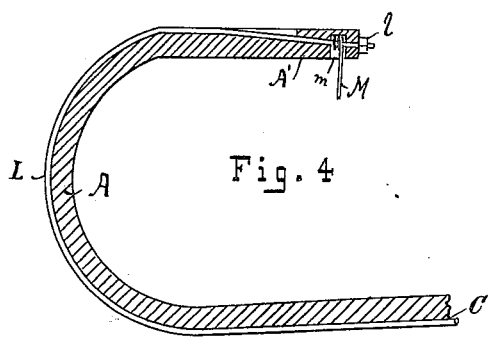
Fig. 4
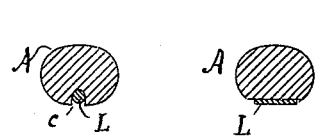
Fig. 5    Fig. 6
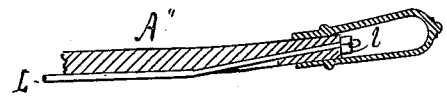
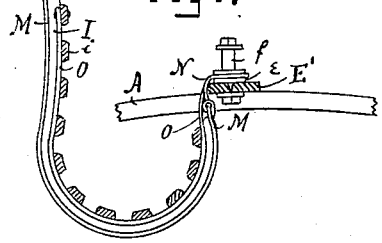
Fig. 7
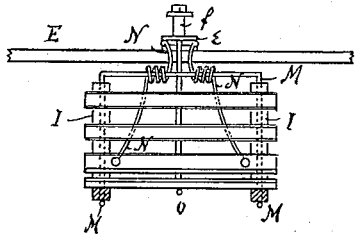
Fig. 8
WITNESSES:
J. C. Wilcke
H. A. Higgins
INVENTOR:
Oliver Hebert

UNITED STATES PATENT OFFICE.

OLIVER HEBERT, OF OSWEGO, ILLINOIS.

TWO-WHEELED VEHICLE.

SPECIFICATION forming part of Letters Patent No. 253,042, dated January 31, 1882.

Application filed June 11, 1881. (No model.)

*To all whom it may concern:*

Be it known that I, OLIVER HEBERT, of Oswego, in the county of Kendall, State of Illinois, have invented certain new and useful Improvements in Two-Wheeled Carts, of which the following is a specification.

Said improvements relate to that class of vehicles which are generally known as "sulky-carts;" and they consist in the construction and arrangement of the shafts, the seat, and foot-rest, in a manner as hereinafter described, and in the peculiar spring construction of the shafts, combining bent wood and steel.

They further consist in the arrangement and mode of suspending the foot-rest, reference being had to the drawings forming part of this specification, in which—

Figure 1:
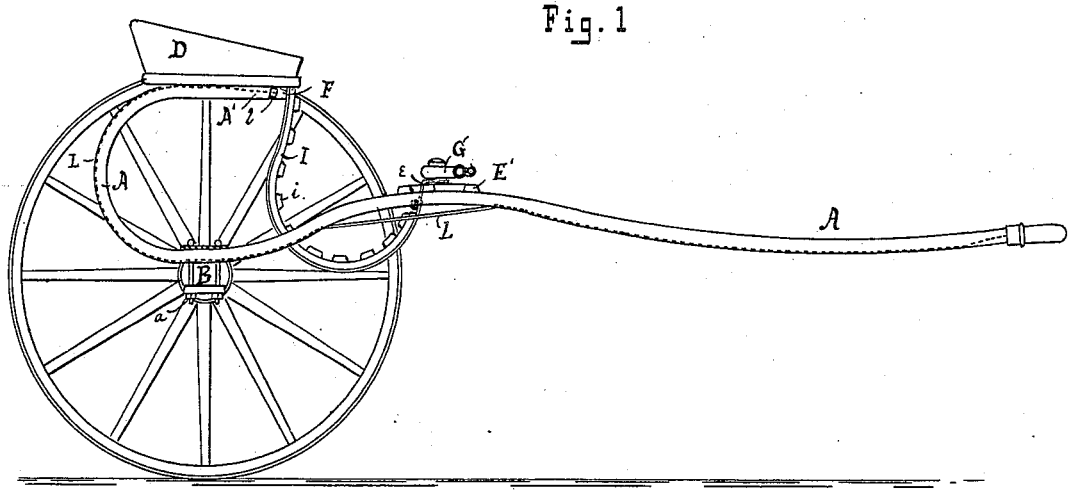
Figure 2:
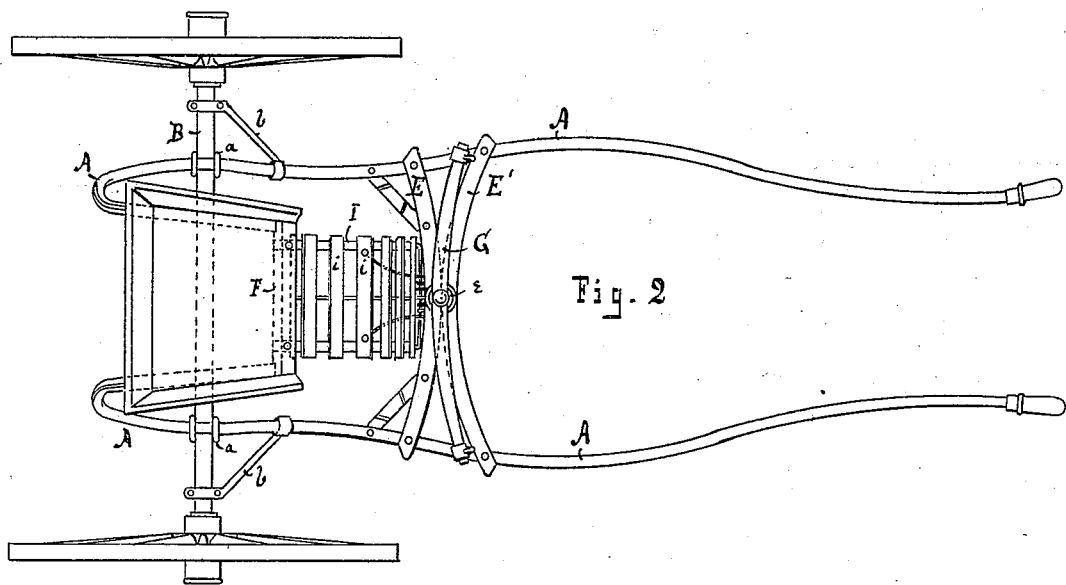

Figure 1 shows a side elevation of my improved cart, one wheel being removed. Fig. 2 shows a plan or top view of the same. Fig. 3 shows an elevation with a modified arrangement of the foot-rest. Fig. 4 shows a section lengthwise through one of the shafts. Figs. 5 and 6 are cross-sections through the shaft and tightening-rod. Figs. 7 and 8 exhibit the foot-rest and manner of suspending the same.

Like letters of reference indicate like parts.

As seen by Figs. 1 and 2, the frame of the cart is formed mainly by two shafts, A A, which, resting on the axis B, are securely held thereto by the clasps $a$ $a$ and braces $b$ $b$. Each of these shafts consists in its entire length of one piece of wood about twelve feet six inches long, which rests on the axis at a point near its middle. The shaft ends at the rear of the axis are curved upward in a C-curve, and its extreme ends extend horizontally, pointing toward the front, forming the support for the seat D.

The shaft ends in front of the axis, constituting the shafts proper, are bent in a suitable manner to adapt them to hitch the horse between them.

Two cross-bars, E and E', connect the shafts in front of the axis, and are held together in the middle by the whiffletree-bolt plate $e$, through which the bolt $f$ extends upward to receive the whiffletree G. Another cross-bar, F, (shown in dotted lines in Fig. 2,) holds the seat ends of the shafts together. Suspended from this cross-bar F or from the ends A' A' of the shafts are C-curved string-pieces I I, which, connected by the slats $i$ $i$ $i$, form the foot-rest, the other ends of said string-pieces being suspended from the whiffletree-bolt plate $e$, in a manner as hereinafter will be shown.

On the outer convex side, in a groove, $c$, throughout the entire length of the shafts A, is arranged a steel rod or strap, L, the screw-threaded ends of which will protrude through holes drilled for this purpose in the ends of the shaft, where they are provided with nuts $l$. (See Figs. 1 and 4.) This rod L serves to regulate the amount of elasticity in the shaft, particularly at the C-curved portion of the same, between axis and seat. The more tension there is imparted to the rod the firmer the support will be at the seat, so that by the adjustment of the nut $l$ at the end of the shaft the spring in the shaft may be adapted to the weight of the person on the seat. The steel rod L also serves in a great degree to strengthen the shaft; also, that it may retain its proper shape and curve, not allowing the same to lengthen beyond its set measure. This combination of steel wire with bent wood for the purpose of strengthening and regulating the amount of elasticity may be otherwise applied in the construction of carriages and for like purposes. Another similar rod or wire, M, Figs. 4 and 7, is suspended from and near the ends A' A' of the shaft, wound around the rod L through a mortise, $m$. This wire passes from one shaft along the outer convex side of one of the foot-rest string-pieces I, then horizontally in front of the foot-board, under the cross-bars E, and backward under the other string-piece to the other shaft. The horizontal front part of this wire M is suspended from the whiffletree-bolt plate $e$ by means of a spring-wire, N, which, clasping around said plate $e$ in the middle, is coiled or wound around the rod M at each side, Fig. 8. The ends of the wire N are passed under the slats $i$ $i$ of the foot-rest and fastened to one of these slats. An additional wire, O, running direct from the whiffletree-bolt under the slats, serves to sustain any direct pressure upon the foot-rest, while the wire ends N are spread out to stiffen the foot-rest against any side pressure. The coils of the wire N, as well as the general form of the rod M, will both tend to rebound any such pressure.

The rod M may be suspended from the ends of the shafts, as described, or from the cross-bar F, which connects the shafts under the seat.

If desired, the string-pieces I I may be bent in an S-curve, as shown in Fig. 3. The ends of the same will then be caused to rest directly upon the axis B. The foot-rest is suspended from the cross-bars in the same manner as before, while the rod M, resting against the outer convex curve of the string-piece, must pass through a hole in the same where the curve changes its course. The rod M is then fastened to the axis.

Having thus described my invention, what I desire to claim, and secure by Letters Patent, is—

1. The shafts A A, with their curved ends A' A', bent in the manner as described and shown, in combination with seat D and axle C.

2. The combination of a bent wooden shaft A with the tightening-wire L, provided with nuts at each end, for the purpose set forth in specification.

3. The combination and arrangement of the foot-rest with the ends of the shafts A A, and plate e, affixed to cross-bars E and E', substantially as shown and described.

4. The foot-rest string-pieces I I, with slats i i, and rod M, in combination with the spring-wires N and O, suspended from plate e on top of the cross-bars, as shown and described.

OLIVER HEBERT.

Witnesses:
J. C. WELCKE,
H. A. HIGGINS.